United States Patent [19]

More et al.

[11] 4,151,264

[45] Apr. 24, 1979

[54] PROCESS OF MELTING DOWN AND PURIFYING SILICON

[75] Inventors: Anton More; Rudolf Riedle; Herbert Straussberger; Willi Streckel, all of Burghausen; Johann Muschi, Munich, all of Fed. Rep. of Germany

[73] Assignee: Wacker-Chemie GmbH, Munich, Fed. Rep. of Germany

[21] Appl. No.: 872,127

[22] Filed: Jan. 25, 1978

[30] Foreign Application Priority Data

Feb. 14, 1977 [DE] Fed. Rep. of Germany ....... 2706175

[51] Int. Cl.$^2$ ............................................. C01B 33/02
[52] U.S. Cl. .................................... 423/348; 423/111; 423/155; 23/308 R
[58] Field of Search ........................ 423/348, 111, 155; 23/308 R

[56] References Cited

U.S. PATENT DOCUMENTS

| 1,180,968 | 4/1916 | Brockbank | 423/348 |
| 3,148,131 | 9/1964 | Coursier et al. | 423/348 X |
| 3,871,872 | 3/1975 | Downing et al. | 423/348 X |

FOREIGN PATENT DOCUMENTS

910368  11/1962  United Kingdom ..................... 423/348

*Primary Examiner*—Jack Cooper
*Attorney, Agent, or Firm*—Allison C. Collard; Thomas M. Galgano

[57] ABSTRACT

A process of melting down and purifying silicon, which comprises melting silicon in at least half of the amount up to double of the amount of a silicate melt heated by resistance heating up to a temperature of at least 1,420° C., said melt consisting of 2–30% by weight of calcium oxide, 5–35% by weight of magnesium oxide, wherein the sum of calcium oxide and magnesium oxide will be 15–38% by weight, 0.5–28% by weight of aluminum oxide and 45–70% by weight of silicon dioxide, and wherein, to the melt are added at least 0.29% by weight of elementary and/or chemically bound copper, preferably 0.50–3% by weight, calculated on the silicon amount.

4 Claims, No Drawings

PROCESS OF MELTING DOWN AND PURIFYING SILICON

The invention relates to the melting down and purifying of silicon. For the preparation of organo-silicon compounds as well as for the preparation of silicon of highest purity from silicon chloroform, ground silicon is conventionally used with a Si-content of 98%. The conversion of the ground silicon is effected mostly in fluidized bed furnaces. Any one of these furnaces, however, can only be used for dust of a particular particle size. Dust which is too coarse will not be whirled up in the fluidized bed, and dust which is too fine, will be blown out of the bed. This blown-out dust has to be discarded. Apart from this inconvenience, part of the dust will get into the product and disturb the subsequent distillation. It was, therefore, found desirable to screen the fine dust obtained by the grinding process. The amount consists of a considerable percentage. For example, in the granules having a size up to 350 μm, about 30% of very fine dust below 50 μm may be contained. This dust, which is obtained in large quantities, is waste, and spells an economic loss, due to the high price of the silicon.

Attempts have been made to melt that dust down in metallurgical furnaces used for the production of silicon, and thus to recycle the silicon, but these attempts were not successful. Moreover, when using these furnaces, it is impossible to remove impurities, such as aluminum or calcium, from the silicon.

It is the object of the present invention to provide a process for melting down and purifying silicon which avoids the disadvantages of the known processes.

This object is accomplished, according to the invention, by melting silicon in at least half of the amount up to double the amount of a silicate melt heated by resistance heating up to a temperature of at least 1,420° C., said melt consisting of 2–30% by weight of calcium oxide, 5–35% by weight of magnesium oxide, wherein the sum of calcium oxide and magnesium oxide will be 15–38% by weight, 0.5–28% by weight of aluminum oxide and 45–70% by weight of silicon dioxide, and wherein to the melt are added at least 0.29% by weight of elementary and/or chemically bound copper, preferably 0.50–3% by weight, calculated on the silicon amount. Furthermore, the silicate melt may contain 0.1–15% by weight of calcium- and/or magnesium fluoride.

The process of the invention makes it possible to render useful, the fine dust of silicon, which, up to now, was a waste product, thereby increasing the economy of a process for obtaining silicon of high purity. Under the conditions of the process, according to the invention, the silicon dust forms a continuous molten layer, which is covered by the silicate melt, and which can be separately withdrawn from the furnace. The same effect will be obtained when pieces of silicon are melted.

The purification of the silicon relates to reduction of the amount of aluminum and calcium. For instance, in the manner mentioned above, the aluminum content of the silicon resulting from the melting process, can be decreased to less than 0.07% by weight, and the calcium content to less than 0.05% by weight.

As mentioned above, the silicate melt contains between 2 and 30% by weight of calcium oxide, and 5 to 35% by weight of magnesium oxide, with the sum of calcium and magnesium oxides being 15 to 38% by weight of the silicate melt. Furthermore, the melt should contain 0.5 to 28% by weight of aluminum oxide and 45 to 70% by weight of silicon dioxide. In some cases, it seems desirable to decrease the viscosity of the silicate melt by the addition of 0.1 to 15% by weight of calcium fluoride and/or magnesium fluoride. For the purpose of bringing about that the drops of the molten silicon in the silicate melt flow together (the emulsion creams up), it is necessary to add at least 0.29% by weight of chemically bound and/or elementary copper to the silicate melt. The silicate melts are preferably of an acid nature. By chemically bound copper, we understand inorganic or organic copper compounds, copper alloys and processed copper minerals, with at least 20% by weight of copper. Preferably, elementary copper is used, e.g., granules made from copper wire.

The amount of copper added depends on the size of the silicon pieces added. When silicon dust is used, a much smoother working of the furnace will result, than when coarse pieces of silicon, e.g., the size of a fist, are used. The more turbulently the melting proceeds, the larger the amount of copper has to be. As a general rule, it may be assumed that when fine silicon particles are used, 0.29% by weight of copper, calculated on the silicon, will have the desired result, when coarse pieces are to be melted, at least 0.5% by weight of copper will be needed. The upper limit of the copper added, is actually only given by economical considerations, when the fact is remembered that when higher copper quantities are added, silicon alloys with higher copper contents will be obtained.

As a furnace for the melting operation, we use, e.g., an electric resistance furnace with tamped carbon lining, and one or several graphite electrodes. The components of the silicate melt are ignited by an electric arc, and are then heated to a temperature above the melting point of silicon, by resistance heating; subsequently, the silicon dust is poured in, in batches, or all at once. When the furnace charge is completely molten, the silicon metal can be tapped.

During the melting operation, the working of the furnace becomes unsteady. That is the time when copper should be added, whereupon the turbulence will again be smoothed down. The yield in silicon melt, calculated on silicon used at the start, is generally about 90%.

The same silicate melt can be used several times, up to 20 times for melting down silicon dust. The usefulness of the silicate melt is over when the silicon will no longer collect in a continuous layer at the bottom of the furnace, e.g., when the silicate melt has become too viscous. It will then be necessary to discard, e.g., say half of the silicate melt, and to replace it with new components. Then work can be continued in the same routine. The composition of the silicate melt changes, on the one hand, by addition of $SiO_2$, resulting from the oxidation of the added silicon dust and, on the other hand, by the accumulation of aluminum and calcium oxides, which are formed by oxidation of impurities contained in the silicon dust used to begin with.

In the following, the process of the invention will be more fully described in an example, but it should be understood that this is given by way of illustration only, and not by way of limitation.

EXAMPLE

About 3 tons of the slag components listed in Table 1, are at one time melted down in an electric resistance furnace, with tamped carbon lining and graphite electrodes. Thereupon, about 2.7 tons of silicon are added to the melt, and as soon as the working of the furnace shows signs of turbulence, the amounts of copper indicated in Table 1, are added. After all solid components are completely molten, the collected silicon melt is tapped. The amount of molten silicon each time was between 2.4 and 2.5 tons. The yield therefore was between 88.8 and 92.5% of the silicon used at the start. The purification effect can be seen from the analysis figures in the Table. The separation between slag and metallic phase was good, except in test 5.

TABLE 1

(all figures are in weight percent)

| TEST NO. | COMPOSITION OF SLAG USED | | | | | | | ANALYSIS DATA OF SILICON MELTING | | | | CU % OF THE Si MELT | SEPARATION SLAG/METAL |
|---|---|---|---|---|---|---|---|---|---|---|---|---|---|
| | CaO | MgO | Al$_2$O$_3$ | SiO$_2$ | FeO | CaF$_2$ | MgF$_2$ | BEFORE | | AFTER | | | |
| | | | | | | | | Al | Ca | Al | Ca | | |
| 1 | 3,8 | 22,5 | 6,9 | 65,8 | 0,5 | — | — | 0,94 | | 0,05 | | 1,20 | GOOD |
| 2 | 4,8 | 16,0 | 9,8 | 68,4 | 0,4 | — | — | 1,09 | 0,26 | 0,06 | 0,01 | 0,89 | " |
| 3 | 29,6 | 6,0 | 5,8 | 57,8 | — | — | — | 0,84 | 0,31 | 0,07 | 0,02 | 0,63 | " |
| 4 | 7,3 | 13,7 | 20,5 | 57,7 | — | — | — | 0,84 | | 0,07 | | 0,29 | " |
| 5 | 7,6 | 16,5 | 15,4 | 59,8 | — | — | — | 0,84 | | 0,05 | | 0,06 | NO |
| 6 | 3,5 | 29,3 | 4,0 | 62,8 | — | — | — | 0,97 | | 0,13 | | 0,60 | GOOD |
| 7 | 7,6 | 19,7 | 24,5 | 45,7 | — | — | — | 0,30 | 0,12 | 0,06 | 0,01 | 3,0 | " |
| 8 | 4,5 | 13,8 | 12,3 | 62,3 | — | 5,2 | — | 0,32 | 0,16 | 0,04 | 0,01 | 2,42 | " |
| 9 | 3,6 | 12,3 | 10,1 | 60,8 | — | — | 12,3 | 1,15 | 0,3 | 0,06 | 0,01 | 1,73 | " |

In the tests 1 to 5 and 7 to 9, fine particles of silicon are dealt with; in test 6, coarse pieces of Si were used.

What is claimed is:

1. A process of melting down and purifying silicon, which comprises melting silicon dust containing aluminum or aluminum and calcium impurities in at least half of the amount up to double of the amount of a silicate melt, heated by resistance heating up to a temperature of at least 1,420° C., said melt consisting of 2–30% by weight of calcium oxide, 5–35% by weight of magnesium oxide, wherein the sum of calcium oxide and magnesium oxide is 15–38% by weight, 0.5–28% by weight of aluminum oxide and 45–70% by weight of silicon dioxide, and wherein, to the melt at least 0.29% by weight of copper is added, calculated on the silicon amount, said copper being selected from the group consisting of elementary and chemically bound copper and a mixture thereof, and separating molten silicon from the silicate melt.

2. The process according to claim 1, wherein from 0.50 to 3% by weight of copper are added in the course of the melting process.

3. A process of melting down and purifying silicon, which comprises melting silicon dust containing aluminum or aluminum and calcium impurities in at least half of the amount up to double of the amount of a silicate melt, heated by resistance heating up to a temperature of at least 1,420° C., said melt consisting of 0.1–15% by weight of a member selected from the group consisting of calcium fluoride, magnesium fluoride, and a mixture thereof, 2–30% by weight of calcium oxide, 5–35% by weight of magnesium oxide, wherein the sum of calcium oxide and magnesium oxide is 15–38% by weight, 0.5–28% by weight of aluminum oxide and 45–70% by weight of silicon dioxide, and wherein, to the melt at least 0.29% by weight of copper is added, calculated on the silicon amount, said copper being selected from the group consisting of elementary and chemically bound copper and a mixture thereof, and separating molten silicon from the melt.

4. The process according to claim 3, wherein from 0.50 to 3% by weight of copper is added in the course of the melting process.

* * * * *